United States Patent [19]

Pritchard et al.

[11] Patent Number: 4,601,579
[45] Date of Patent: Jul. 22, 1986

[54] HIGH INTENSITY FOURIER SPECTROMETER

[76] Inventors: James L. Pritchard, Norfolk, Mass.; James A. Pritchard, 22 Needham St., Norfolk, Mass. 02056; Mary H. Pritchard, 52 Needham St., Norfolk, Mass. 02056, Administrator of said James L. Pritchard, deceased

[21] Appl. No.: 548,667

[22] Filed: Nov. 4, 1983

[51] Int. Cl.[4] .............................................. G01J 3/45
[52] U.S. Cl. ..................................... 356/346; 350/453
[58] Field of Search ......................... 356/346; 350/453

[56] References Cited

U.S. PATENT DOCUMENTS

3,216,314  11/1965  Morokuma .
3,976,739   8/1976  Morokuma .
4,084,909   4/1978  Mathiesen .
4,095,900   6/1978  Murphy et al. .
4,345,838   8/1982  Buijis et al. .

OTHER PUBLICATIONS

Hanel, "Fourier Spectroscopy on Planetary Missions Including Voyager", *Proc. SPIE*, vol. 289, pp. 331-344, 1981.

*Primary Examiner*—Davis L. Willis
*Assistant Examiner*—Matthew W. Koren
*Attorney, Agent, or Firm*—John F. McClellan, Sr.

[57] ABSTRACT

A system for reducing wavelength error caused by angular motion of the moving mirror of an interferometer, such as a Michelson interferometer having fore-optics introducing a beam of radiant energy for impingement on the moving mirror, teaches reducing, without necessary loss of energy, the width of the beam before impingement on the moving mirror; other advantages also accrue to use of the reduced width beam, such as facility in use of absorption cells and multiplying clear path length, when desired.

6 Claims, 8 Drawing Figures

OLD ART

OLD ART

OLD ART

HIGH INTENSITY FOURIER SPECTROMETER

FIELD OF THE INVENTION

This invention relates generally to interferometry and specifically to foreoptics systems in conjunction with interferometers.

BRIEF SUMMARY OF THE INVENTION

In brief summary given as cursive description only and not as limitation, the invention teaches reducing wavelength error caused by angular movement of a translating mirror in an interferometer, represented by a Michelson interferometer, by reducing, without necessary loss of energy, the effective width of the beam impinged on the translating mirror.

DETAILED DESCRIPTION

It is classical to assume that the moving mirror in an interferometer configuration constitutes the aperture of the instrument. When looking at a star or some other such distant source not under our control, the moving and stationary mirrors do constitute the aperture of the system. The concept persists in all aspects of interferometry until this day that the wider the aperture, the better the instrument.

A detector in an interferometer system sees only the modulation intensity of the beam that impinges on it. (Thermal effects are another matter, but are not a practical consideration here.) The interferometer then, develops the resulting interferogram, which is intensity-dependent.

All instruments of the interferometric type depend on the moving mirror to establish the throughput (intensity) to the detector. An interferometer as an instrument is a modulation device and does not measure the intensity of the beam impinging on it for operation. It is that throughput (intensity) that passes through the interferometer and then impinges on the detector that counts; the detector in an interferometric system sees only the modulation intensity of the beam that impinges on it. In the classical cases mentioned, where the source of the beam is not at our disposal (as in the case of distant stars, for example) it is obvious that the throughput, and therefore the intensity of the beam in question, should be as large as possible. In this way the greatest amount of information possible will be collected and be impinged upon the detector. In fact, in the usual case, the source is used as indicated in the first Figure.

Figure 1:
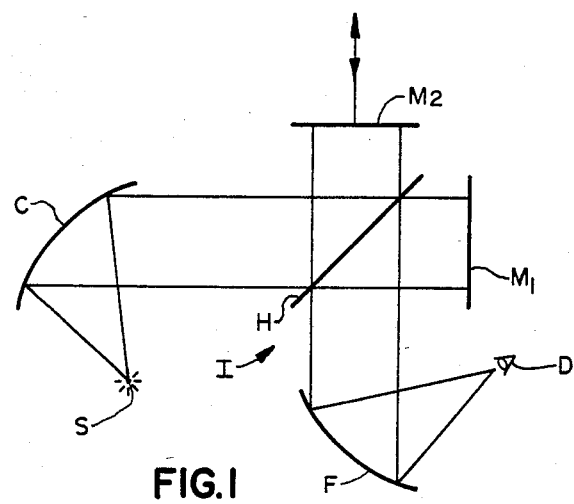
FIG. 1 is a plan diagram of an old art interferometer.

FIG. 1 shows old art in the form of a Michelson interferometer I with a source S and collimating mirror C, beam-splitter H, fixed mirror $M_1$, moving mirror $M_2$, focusing mirror F and detector D. Notice that the amount of light that can be captured on the moving mirror $M_2$ constitutes essentially the aperture. This arrangement is not very convenient, as for example in working with sample cells. Thus, many, if not all, manufacturers of this type of instrument will bring some modification to it.

Current practice usually involves collimating the beam, then narrowing it to a focus in order to pass it through a sample chamber or for any reason whatever, after which it is expanded to original size. Once expanded to original size, it is then collimated again to pass it to the interferometer. This gives the ratio of the initial parallel beam and the reexpanded parallel beam a ratio of 1:1.

Figure 2:
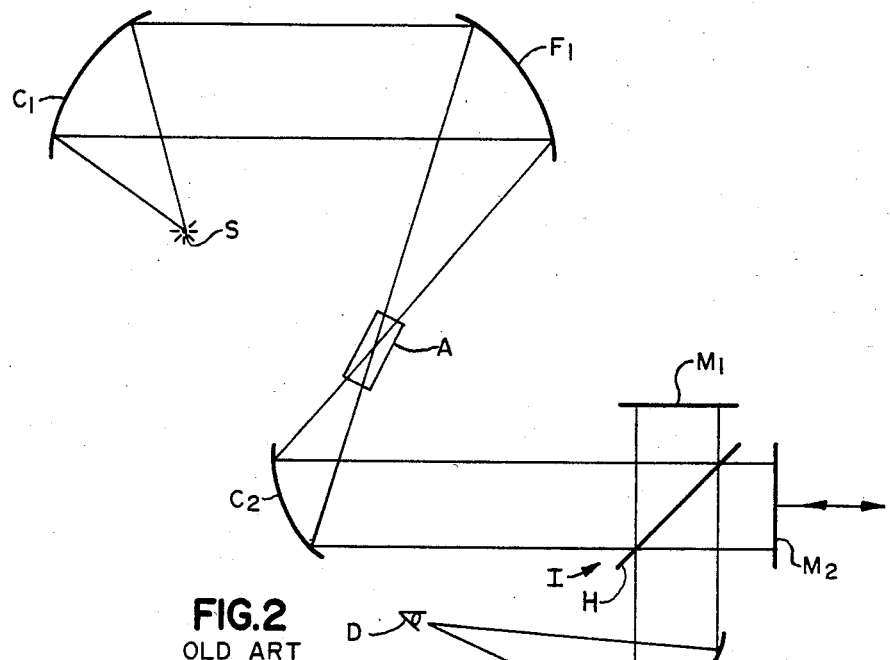
FIG. 2 is a plan diagram of a second arrangement of old art interferometer.

FIG. 2 shows source S, first collimating mirror $C_1$, first focusing mirror $F_1$, sample cell A at the focus, second collimating mirror $C_2$, and interferometer I, with beamsplitter H, fixed mirror $M_1$, moving mirror $M_2$, second focusing mirror $F_2$, and detector D, in an old art arrangement.

Note that again, in FIG. 2, the aperture is essentially that of the moving mirror.

Figure 3:
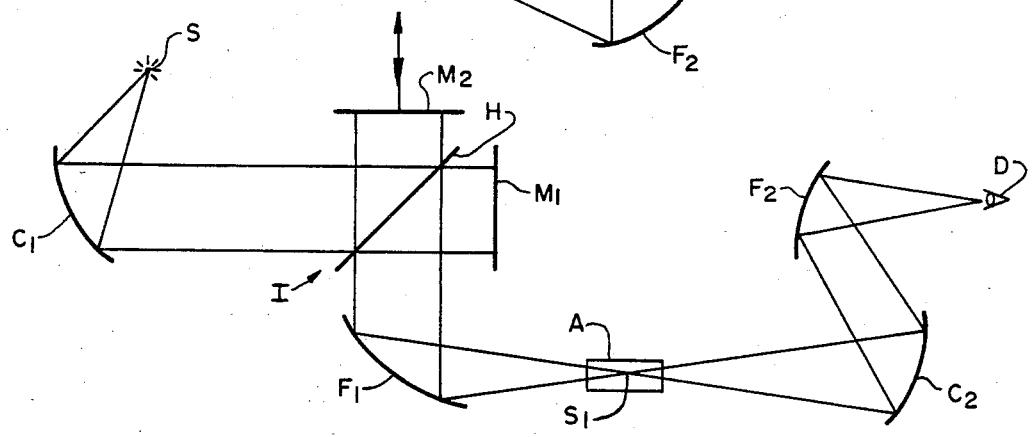
FIG. 3 is a plan diagram of a third arrangement of old art interferomter.

FIG. 3 shows an old art arrangement used for convenience in sample cell disposition. Radiation from source S passes to first collimating mirror $C_1$, then to the interferometer I in which H is the beamsplitter, $M_1$ the fixed mirror, $M_2$ the moving mirror, $F_1$ a first focusing mirror; A, a sample cell; $S_1$, the focus; $C_2$ a second collimating mirror, $F_2$ a second focusing mirror, and D the detector.

These and many other models of interferometers depend for their throughput on the aperture of the movable mirror. The movable mirror's aperture is the aperture. Since our invention will relieve the movable mirror of its aperture defining responsibility, a discussion of the aperture of an optical element is necessary.

Figure 4:
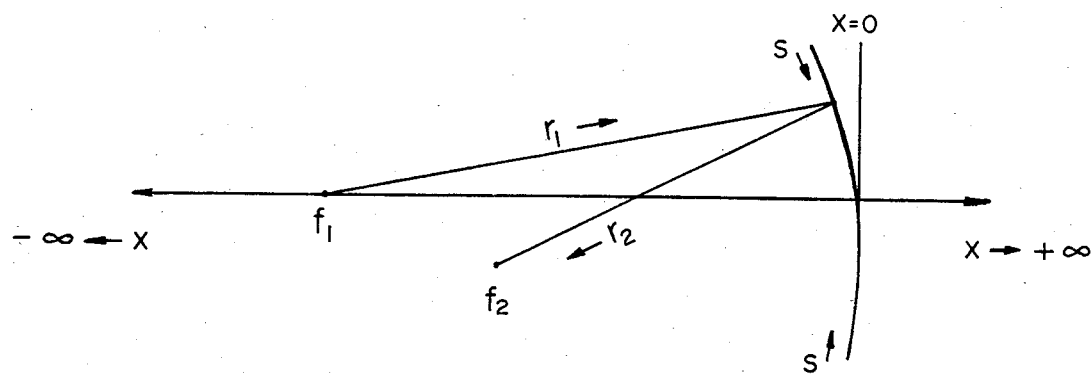
FIG. 4 is an optical surface aperture calculation diagram.

See FIG. 4. Let S be an optical surface. Let $f_1$ and $f_2$ be two foci, either one of which may be virtual or real and whose positions in $[-\infty, +\infty]$ are unspecified. Let the coordinate system be chosen such that the principle ray from $f_1$ and the x axis coincide. The Effective Clear Aperture of S relative to $f_1$ is $$\Sigma(S, f_1) = \int_s \vec{1_1} \cdot \vec{dS}$$

Where $r_1$ and $r_2$ are rays from and to $f_1$ and $f_2$ as shown, the tip of $r_1$ ranging over surface S as the integral ranges over S;

$1_1$ and $1_2$ are unit vectors having directions parallel to rays $r_1$ and $r_2$ respective;

dS is the differential unit of surface S whose direction is normal to the plane of tangency at tip of $r_1$ and pointing away from $f_1$.

The expression says that to find the effective clear aperture relative to $f_1$, the optical surface is to be divided into infinitesimal elements of area dS and the scalar quantity $1_1.dS$ is to be evaluated for each element and the sum taken over the entire surface. If $f_1$ is at infinity, then the effective clear aperture relative to $f_1$ and ordinary clear aperture coincide; clear aperture is a special case of effective clear aperture.

Figure 5:
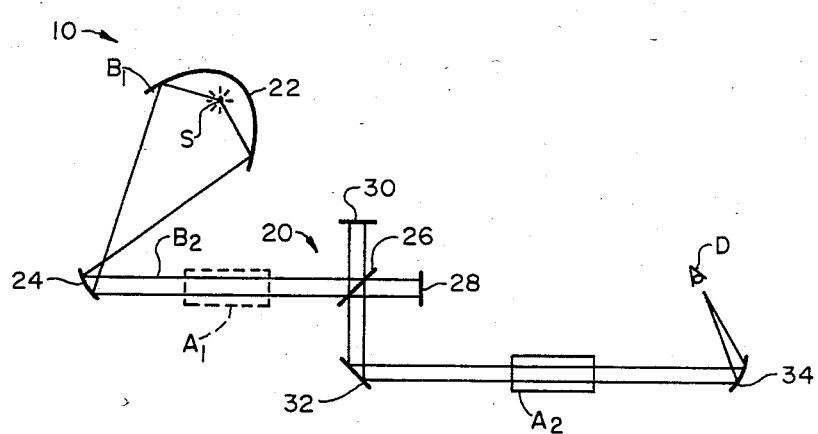
FIG. 5 is a plan diagram of an exemplary preferred embodiment of this invention.

FIG. 5 shows the invention in embodiment 10, a combination with an interferometer 20 and source S, focusing mirror 22, collimating mirror 24 producing parallel beam $B_2$ narrower than effective clear aperture $B_1$ of focusing mirror 22, sample cell $A_1$ in beam $B_2$ if desired, the interferometer 20 with beam-splitter 26, fixed mirror 28, movable mirror 30, diagonal mirror 32 if desired, alternate sample cell $A_2$, if desired, second focusing mirror 34 and detector D.

One advantage to the invention is that optics which are highly efficient in increasing throughput, but had previously been thought useless to this application, can be employed at great benefit. FIG. 5, for example, features an ellipse, depicted as focusing mirror 22. FIG. 5 is by no means the only invention embodiment.

Figure 6:
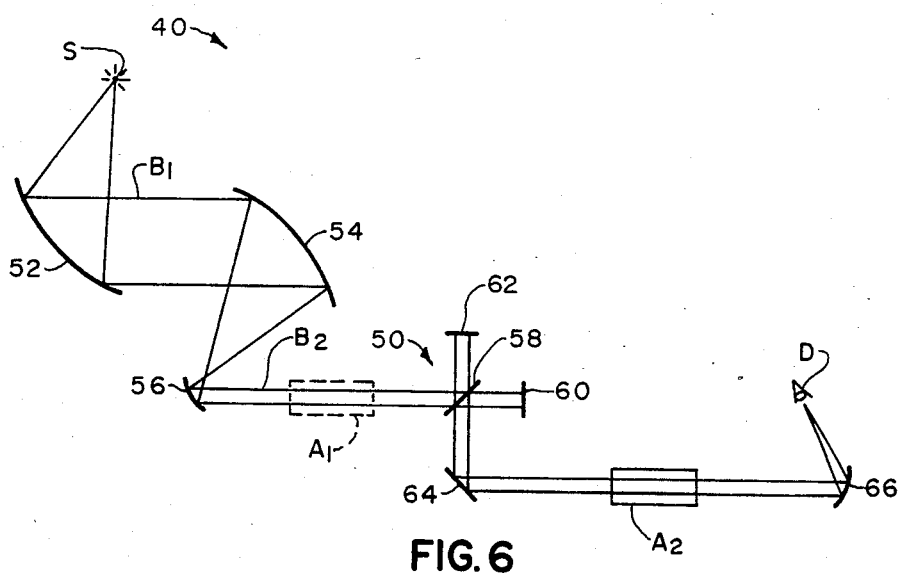
FIG. 6 is a plan diagram of a second exemplary preferred embodiment of this invention.

FIG. 6 shows the invention, using more conventional optics, in embodiment 40, a combination with an interferometer 50 and source S, first collimating mirror 52, first focusing mirror 54, second collimating mirror 56 producing a parallel beam $B_2$ narrower than effective clear aperture $B_1$ (parallel beam) of the first collimating mirror, sample cell $A_1$ in beam $B_2$ if desired, the interferometer 50 with beamsplitter 58, fixed mirror 60, moving mirror 62, diagonal mirror 64 if desired, alternate sample cell $A_2$, if desired, second focusing mirror 66, and detector D. Also, the design in FIG. 5 and the design in FIG. 6 may act in conjunction to produce a still narrower beam. Other designs will be apparent to one skilled in the art, from the invention.

A most important advantage of this invention appears here. The use of the relatively narrower beam of light $B_2$ loosens the wobble tolerance demands on the moving mirror. When a beam of given flux density (intensity) strikes a moving mirror, it is essential that there should be no angular distortion, or wobble, in the mirror movement. If the mirror does not move exactly parallel to itself, distortion in the interference wavelengths will occur. In fact, the usefulness of the entire interferometer is much impaired if the distortion is much greater than $\lambda/10$. As a result, present manufacturers have indeed gone to great lengths to guarantee parallelism in the movement of their mirrors.

However, in using a narrow beam of the same flux density (intensity) on the same mirror, the same amount of wobble, or angular displacement in the movement of the mirror, will cause much less distortion to be passed on to the detector. This is because the increase or decrease in distortion (all other factors remaining equal) is mathematically a ratio of the width of the beam. That is, it is ratio of the measurement of the sides of the similar triangles formed. That is $\lambda_1/\lambda_2 = B_1/B_2$.

Figure 7:
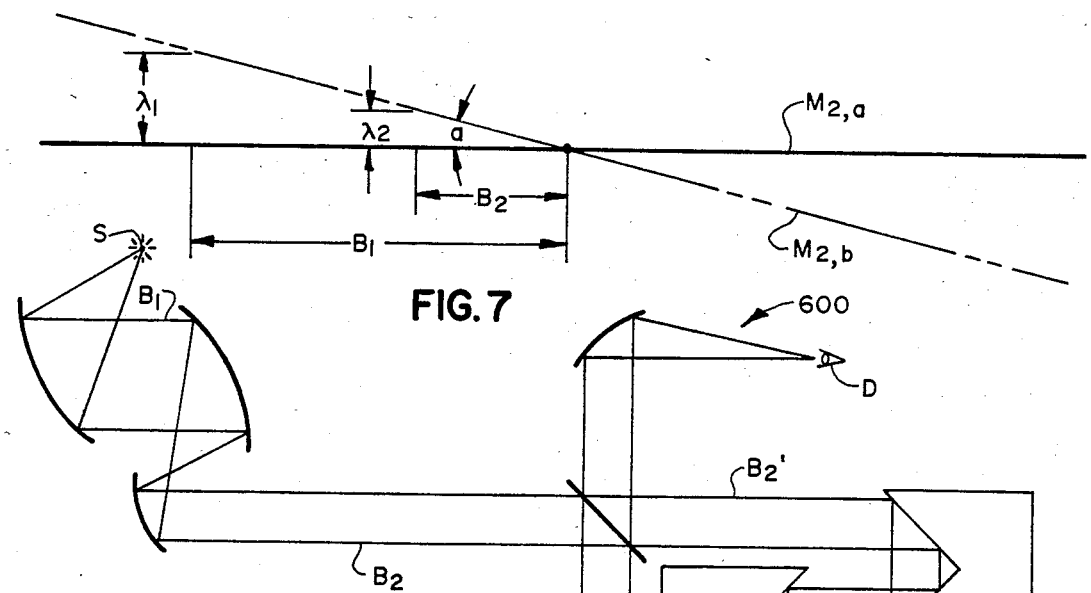
FIG. 7 is a plan schematic showing two angular positions of a moving mirror such as that in a Michelson interferometer and the proportional wavelength error produced by a wide beam relative to a narrow beam.

FIG. 7 details the aspect. Two positions $M_2$, a and $M_2$, b of the moving mirror $M_2$ diagram a wobble through angle "a". Because beam $B_2$ impinges on the mirror in a smaller spot or one having less extent along the mirror, the displacement $\lambda_2$ is proportionally less for any given angle "a" than that, $\lambda_1$, for wider beam $B_1$.

So, given two beams of light of the same flux density, we can say that the narrower the beam the smaller the change in $\lambda$ as it impinges on the moving mirror and the smaller the amount of distortion.

There are several other advantages represented by embodiment 10, illustrated in FIG. 5. There is no loss in throughput. It is immediately obvious that if the same source is used and the same off-axis parabolic mirror is used, the entering rays focused on the detector (assuming that, in the interest of comparison, the sample cells are empty in all cases) are of the same intensity in FIGS. 1, 2, 3 and 6, neglecting losses from first surface mirrors.

Thus, novelty of our invention resides in controlling the emitting flux density from any configuration of fore-optics at all in a small envelope and thus being able to use, as a consequence, a smaller mirror. Also, the small envelope can be sent directly, without focusing, through many sample cells, and multiple pass configurations. It has use in double pass systems, too.

Figure 8:
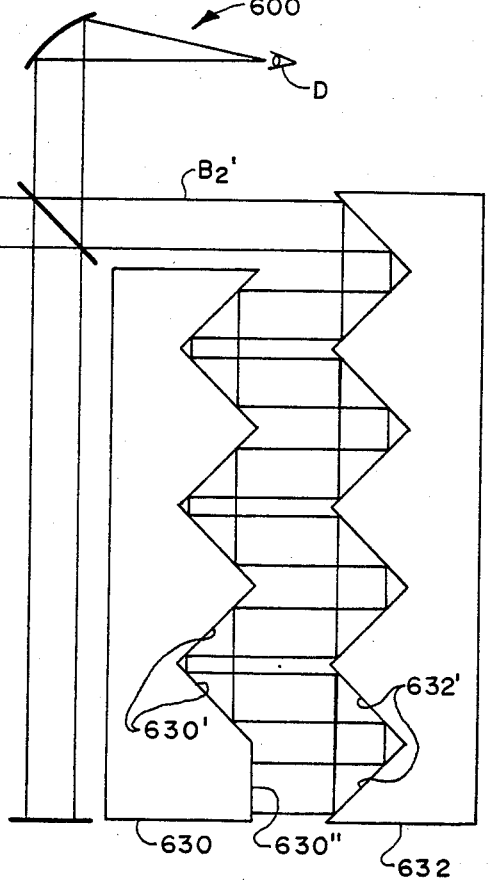
FIG. 8 is a plan diagram of an embodiment of this invention.

FIG. 8 shows embodiment 600, similar to that of FIG. 6, except that the fixed mirror 630 may be a unitary array of contiguous dihedral mirrors, 630' and the moving mirror 632 may be a similar unitary array of contiguous dihedral mirrors 632' opposed in complementary relation to the fixed mirror.

This Figure demonstrates how a beam $B_2$ narrow relative to beam $B_1$ permits us to achieve a very long optical path difference in a small space. If the moving mirrors are caused to move a path difference if 1 cm, then the optical path difference will be twice the number of mirrors less one in the configuration, that is the O.P.D.$=2(n-1)$, where n equals the number of mirrors. It will be apparent to one skilled in the art that the number of mirrors used can be extended at the desire of the instrument designer. Since an extremely narrow beam will allow for miniaturized mirrors, it is apparent that many mirrors can be utilized with ease, producing a very long Optical Path Difference. This is important, since the relationship, resolution$=1/$O.P.D. cm$^{-1}$, expressed in reciprocal centimeters, demonstrates that it is highly desirable to have a long path length in an interferometer.

With the advent of replication, the unitary arrays of dihedral mirrors described are easily fabricated.

Other schemes incorporating the essential ideas in this Figure can be employed by those skilled in the art.

In the examples, the concave mirrors shown may be conventional first surface off-axis parabolas, except where noted as in FIG. 5, where the focusing element is an ellipse.

Any reduction in size of input beam will proportionally improve mirror wobble or tilt. Because the intensity of the beam is increased by $1/R^2$ as it is narrowed, narrowing the moving mirror impinging beam to a value substantially below 95% of the effective clear aperture of the first collecting optic can bring significant advantages, the narrower the greater the gain, down to a lower limit.

A lower limit on gain in narrowing the beam would be imposed by diffraction dependence of the aperture, the first minimum occurring at 1.22 $\lambda/a$ for a circular aperture; wavelength dependence of the circular aperture is a practical consideration that will be apparent to those skilled in the art.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. A system for reducing wavelength distortion caused by angular movement of the moving mirror of a Michelson interferometer having in combination therewith means for directing onto the moving mirror a beam of parallel radiation from a source, the means for directing including in combination: means for producing a first collimated beam with all said radiation therein, means for bringing to a focus all said radiation in said first collimated beam, means for producing from said focused radiation a second collimated beam with all said radiation therein in position for impingement on said moving mirror of the Michelson interferometer, said first and second collimated beams having respective beam widths, and the beam width of the second collimated beam being substantially less than the beam width of the first collimated beam; thereby reducing wavelength distortion caused by angular movement of said moving mirror.

2. A system for reducing wavelength distortion caused by angular movement of the moving mirror of a Michelson interferometer having in combination therewith means for directing onto the moving mirror a beam of parallel radiation from a source, the means for directing including in combination: means for producing a first collimated beam with all said radiation therein, means for bringing to a focus all said radiation in said first collimated beam, means for producing from said focused radiation a second collimated beam with all said radiation therein position for impingement on said moving mirror of the Michelson interferometer, said first and second collimated beams having respective beam widths, the beam width of the second collimated beam being substantially less than the beam width of the first collimated beam; thereby reducing wavelength distortion caused by angular movement of said moving mirror, said means for producing a first collimated beam being a first concave mirror located for receiving radiation from a said source, said means for bringing to a focus being a second concave mirror having a contour for focusing said radiation received, and said means for producing a second collimated beam in position for impingement on said moving mirror being a third concave mirror.

3. A system for reducing wavelength error in a beam of radiant energy caused by wobble of a Michelson interferometer moving mirror from which the beam of radiant energy is reflected, comprising in combination: first means for producing a parallel beam of a first width containing all said radiant energy, means for bringing to a focus all said radiant energy in said parallel beam of a first width, and second means for producing a parallel beam of a second width narrower than the first width containing all said radiant energy for impingement of same on said Michelson interferometer moving mirror.

4. A system for reducing wavelength error in a beam of radiant energy caused by wobble of a Michelson interferometer moving mirror from which the beam of radiant energy is reflected, comprising in combination: first means for producing a parallel beam of a first width containing all said radiant energy, means for bringing to a focus all said radiant energy in said parallel beam of a first width, second means for producing a parallel beam of a second width narrower than the first width containing all said radiant energy for impingement of same on said Michelson interferometer moving mirror; said first for producing a parallel beam being a first concave mirror, said means for bringing to a focus being a second concave mirror, and said second means for producing a parallel beam being a third concave mirror.

5. A method of reducing wavelength distortion caused by error of movement of a moving mirror of an interferometer receiving through the source-related effective clear aperture of a collecting optic a beam of radiant energy, for impingement on the moving mirror as a parallel beam, comprising the steps:
 (a) forming from said beam of radiant energy received through the effective clear aperture a parallel beam with a width substantially narrower than said effective clear aperture; and
 (b) impinging said narrower-width parallel beam on said moving mirror, instead of the first said parallel beam;
thereby reducing wavelength distortion caused by said error of movement of the moving mirror.

6. A method of preserving the energy content of a beam of radiant energy for impingement on the moving mirror of a Michelson type interferometer, while reducing wavelength distortion incident to said moving mirror movement, comprising the steps:
 (a) collecting a beam of radiant energy through a solid angle producing a first parallel beam having a width and energy content characteristic of said collecting;
 (b) forming a second parallel beam from said first parallel beam with reduced width but preserved energy content; and
 (c) impinging said second parallel beam on said moving mirror with said reduced width aligned with the width of said moving mirror, thereby preserving the energy content of said beam of radiant energy while reducing wavelength distortion "incident" to said moving mirror movement.

* * * * *